US008728416B2

(12) United States Patent
Buchert

(10) Patent No.: US 8,728,416 B2
(45) Date of Patent: *May 20, 2014

(54) METHOD AND APPARATUS FOR THERMAL PROCESSING OF SLURRY

(76) Inventor: Jürgen Buchert, Schweinfurt (DE)

( * ) Notice: Subject to any disclaimer, the term of this patent is extended or adjusted under 35 U.S.C. 154(b) by 971 days.

This patent is subject to a terminal disclaimer.

(21) Appl. No.: 12/841,451

(22) Filed: Jul. 22, 2010

(65) Prior Publication Data

US 2010/0283257 A1 Nov. 11, 2010

Related U.S. Application Data

(62) Division of application No. 11/854,874, filed on Sep. 13, 2007, now Pat. No. 7,799,960.

(30) Foreign Application Priority Data

Dec. 22, 2006 (DE) .................. 10 2006 061 217

(51) Int. Cl.
*B01J 8/00* (2006.01)
(52) U.S. Cl.
USPC ............ 422/620; 422/621; 422/215; 422/225
(58) Field of Classification Search
USPC .......... 585/240, 242; 422/620, 621, 215, 225; 210/179
See application file for complete search history.

(56) References Cited

U.S. PATENT DOCUMENTS

| 4,010,098 | A | 3/1977 | Fassell |
| 4,145,188 | A | 3/1979 | Espenscheid et al. |
| 6,663,777 | B2 | 12/2003 | Schimel |
| 7,285,694 | B2 | 10/2007 | Countz |
| 7,473,348 | B2 | 1/2009 | Koch |
| 7,799,960 | B2 * | 9/2010 | Buchert ......................... 585/240 |
| 7,803,333 | B2 * | 9/2010 | Buchert ......................... 422/215 |
| 7,947,858 | B2 * | 5/2011 | Buchert ......................... 585/240 |
| 8,133,393 | B2 * | 3/2012 | Stuart ........................... 210/606 |
| 8,409,439 | B1 * | 4/2013 | Tovani et al. ................. 210/603 |
| 8,414,771 | B2 * | 4/2013 | Stuart ........................... 210/606 |
| 8,501,402 | B2 * | 8/2013 | Urthaler et al. ................ 435/6.1 |
| 2006/0096163 | A1 | 5/2006 | Dickinson et al. |
| 2007/0131585 | A1 | 6/2007 | Koch |

FOREIGN PATENT DOCUMENTS

| DE | 39 28 815 A1 | 6/1990 |
| DE | 10 2005 056 735 B3 | 8/2006 |
| EP | 1 462 417 A1 | 9/2004 |

* cited by examiner

*Primary Examiner* — Nina Bhat
(74) *Attorney, Agent, or Firm* — Henry M. Feiereisen LLC

(57) ABSTRACT

In a method and apparatus for thermal processing of slurry, the slurry is combined with a bio-mass to produce a mixture which is then subjected to a cracking temperature in a receiving tank, thereby liquefying and allowing the mixture to catalytically undergo a cracking reaction. The cracking reaction which the liquefied mixture undergoes is continued in a mixer pump to thereby produce a reaction mixture. The reaction mixture is outgased in an intermediate tank to separate an outgased fraction from a non-outgased fraction. Subsequently, the outgased fraction is allowed to cool down, thereby producing fuel, while the non-outgased fraction is returned to the receiving tank and subjected again to the cracking temperature. Residual matter of the non-outgased fraction settles in the intermediate tank and is periodically removed.

12 Claims, 1 Drawing Sheet

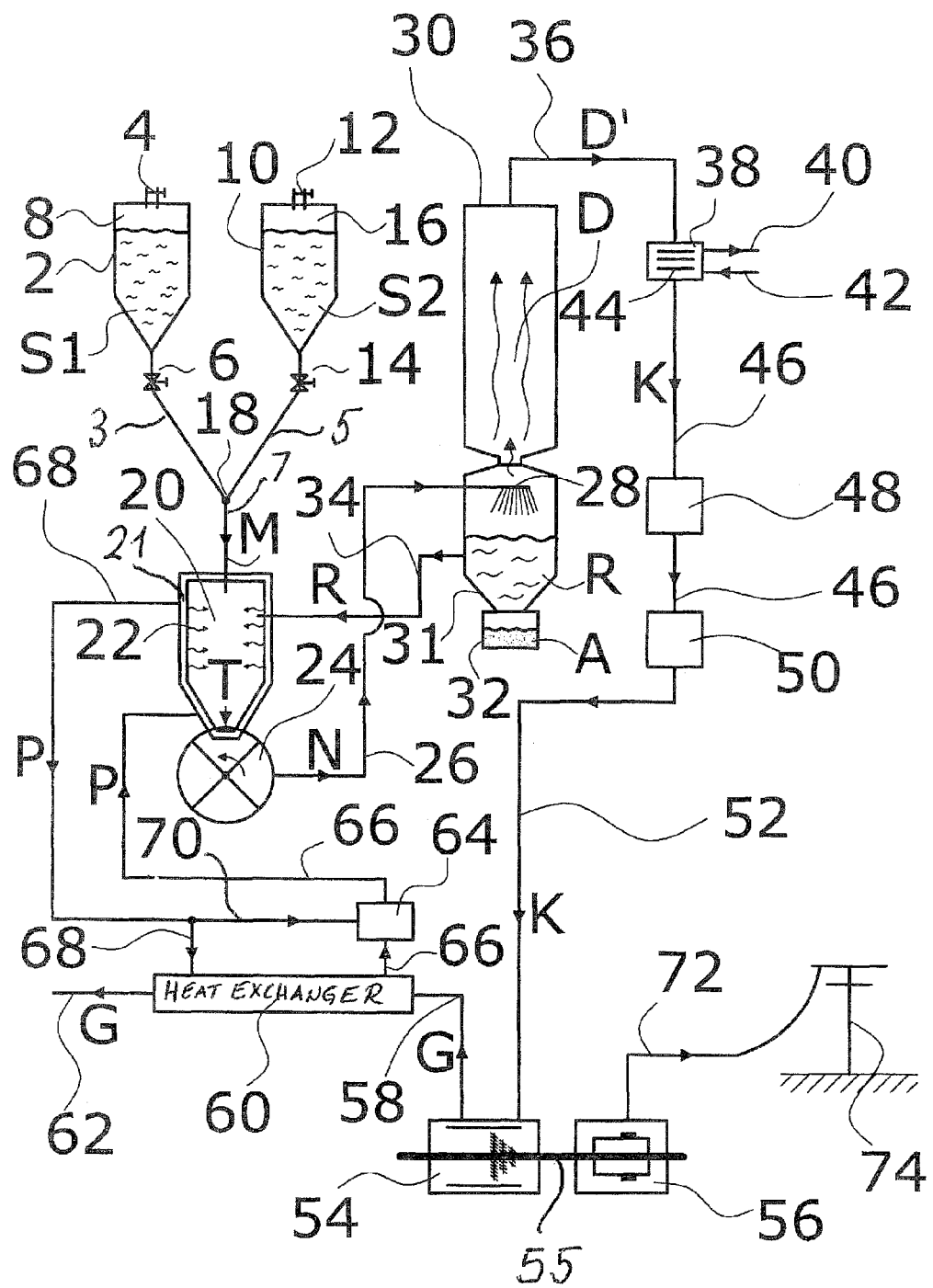

METHOD AND APPARATUS FOR THERMAL PROCESSING OF SLURRY

CROSS-REFERENCES TO RELATED APPLICATIONS

This application is a divisional of prior filed U.S. application Ser. No. 11/854,874, filed Sep. 13, 2007, the priority of which is hereby claimed under 35 U.S.C. §120, and which claims the priority of German Patent Application, Serial No. 10 2006 061 217.5-44, filed Dec. 22, 2006, pursuant to 35 U.S.C. 119(a)-(d)

The contents of U.S. application Ser. No. 11/854,874 and German Patent Application, Serial No. 10 2006 061 217.5-44 are incorporated herein by reference in its entirety as if fully set forth herein.

BACKGROUND OF THE INVENTION

The present invention relates to a method and apparatus for thermal processing of slurry.

Nothing in the following discussion of the state of the art is to be construed as an admission of prior art.

To ensure clarity, it is necessary to establish the definition of several important terms and expressions that will be used throughout this disclosure. The term "slurry" is used here in a generic sense and may refer to sewer sludge in general, or to partly dried sludge having a moisture content of less than or little more than 10% of water. Partly dried sludge typically contains 60% of inorganic material, about 30% of organic material, and about 10% of water. Of course, sludge of greater water content may be applicable here as well.

Disposal of slurry that has accumulated in industrial plants or sewage plants poses a problem because farmers or agriculturists use slurry less and less to fertilize fields. The reason is the content of organic toxic agents and heavy metals that pose a risk to health and may be passed on to plants and fruits that grow on the fields. It is clear that entry of these types of materials into the food chain must be prevented.

It would therefore be desirable and advantageous to address this problem and to obviate other prior art shortcomings.

SUMMARY OF THE INVENTION

According to one aspect of the present invention, a method of thermal processing of slurry includes the steps of combining slurry with a bio-mass to produce a mixture, subjecting the mixture to a cracking temperature thereby liquefying and allowing the mixture to catalytically undergo a cracking reaction, continue to subject liquefied mixture to a cracking reaction in a mixer pump to produce a reaction mixture, outgasing the reaction mixture in an intermediate tank to produce an outgased fraction and a non-outgased fraction, cooling down the outgased fraction to produce fuel, returning the non-outgased fraction and subjecting it again to the cracking temperature, and periodically removing from the intermediate tank settled residues from the non-outgased fraction.

According to another feature of the present invention, the cracking temperature may range from 250° C. to 380° C.

According to another feature of the present invention, the fuel may be dewatered. Suitably, the fuel can be used for generating electricity. Fuel may hereby be combusted in a turbine for driving a generator, while exhaust gas from the turbine can be used for generating the cracking temperature. The exhaust gas may thus be used for heat introduction in a thermal oil circulation for producing the cracking temperature. In other words, the energy content of fuel can be exploited for generating electricity and/or heat for a wide range of applications.

According to another feature of the present invention, the bio-mass may be biological waste material, e.g. rape residues or wood residues, e.g. sawdust, sugar beet residues, husks obtained during beer brewing or liquor production, animal meal, cellulose from paper production, press cake from feedstock production for animals, straw and the like, as well as other substances, such as various grains, corn, etc. Thus, in addition to the organic fraction of the slurry, biological mass, which is also considered difficult to recycle, can be disposed of.

According to another aspect of the present invention, an apparatus for thermal processing of slurry, includes a first reservoir for accepting slurry, a second reservoir for accepting bio-mass, a mixing area receiving slurry from the first reservoir and bio-mass from the second reservoir for combining slurry and bio-mass to produce a mixture, a receiving tank, receiving the mixture from the mixing area, for heating the mixture to a cracking temperature to thereby trigger a catalytic cracking reaction, a mixer pump disposed downstream of the receiving tank and receiving liquefied mixture from the receiving tank for continually subjecting the liquefied mixture to the cracking reaction, an intermediate tank, an outgasing device accommodated in the intermediate tank, a distillation column disposed downstream of the intermediate tank, a feed line fluidly connecting the mixer pump to the outgasing device, a return line fluidly connecting the intermediate tank and the receiving tank for returning a non-outgased fraction of the mixture, and a condenser fluidly connected to a top of the distillation column for cooling an outgased vaporized fraction of the mixture to thereby produce fuel, with the condenser having an outlet for discharge of the fuel.

According to another feature of the present invention, a processing device may be disposed downstream of the outlet of the condenser for dewatering the fuel. Suitably, a storage tank may be fluidly connected to the condenser for collecting the purified product.

According to another feature of the present invention, the receiving tank may have a double-jacketed configuration for circulation of hot thermal oil. Suitably, the thermal oil has a temperature which is adjusted to closely reach the cracking temperature. The receiving tank may hereby be part of a circulation system for the thermal oil, with the circulation system further including a heat exchanger.

According to another feature of the present invention, produced fuel may be supplied from the condenser to a turbine. Exhausts from the turbine can be conducted to the heat exchanger for utilizing the energy content. The turbine may also be operatively connected to a generator which may be connected to the public power grid.

The present invention is based on the recognition that a combination of slurry with a biological mass (bio-mass) and subjecting this mixture to a thermal process triggers a catalytic process by which organic substances in the slurry as well as in the bio-mass substantially break down. The catalytic process is triggered by substances in the slurry that have a catalytic effect on the bio-mass. Most likely, these substances involve mineral constituents of the slurry. Even though the thermal-catalytic effect on the bio-mass depends on the slurry composition which may greatly vary. Still, tests have shown that slurry, e.g. originating from municipal sewage plants or industrial plants, in particular in the form of "partly dried slurry", and the added bio-mass can react in accordance with the present invention in such a way that organic constituents from both starting materials can be catalytically cracked.

What is left after the catalytic reaction is merely a solid residue that can easily be stored for example.

In accordance with the present invention, slurry and biomass as starting materials can be used for generating energy as a result of thermally cracking organic substances, while at the same time realize a mass reduction in the absence of any additional catalyst(s). Of course, in an exceptional case, it may be suitable to add an external catalyst. Overall, the apparatus and the method according to the invention can be realized in a cost-efficient and simple manner while being reliable in operation.

BRIEF DESCRIPTION OF THE DRAWING

Other features and advantages of the present invention will be more readily apparent upon reading the following description of currently preferred exemplified embodiments of the invention with reference to the accompanying drawing, in which the sole FIGURE shows a schematic illustration of one embodiment of an apparatus for thermal processing of slurry in accordance with the present invention.

DETAILED DESCRIPTION OF PREFERRED EMBODIMENTS

The depicted embodiment is to be understood as illustrative of the invention and not as limiting in any way. It should also be understood that the FIGURE is not necessarily to scale. Details which are not necessary for an understanding of the present invention or which render other details difficult to perceive may have been omitted.

This is one of two applications both filed on the same day. Both applications deal with related inventions. They are commonly owned and have the same inventive entity. Both applications are unique, but incorporate the other by reference. Accordingly, the following U.S. patent application is hereby expressly incorporated by reference: "Method and Apparatus for Catalytically Processing Slurry".

Turning now to the sole FIGURE, there is shown, by way of example, a schematic illustration of one embodiment of an apparatus for thermal processing of slurry in accordance with the present invention. As will be described hereinafter, this example of an apparatus according to the present invention involves the production of fuel for supply to a turbine generator by which the fuel is converted into electric energy for feeding a public power grid, while at the same time utilizing the energy content of turbine exhausts for the process according to the invention.

The apparatus includes a first reservoir 2 having a closeable inlet 4 for accepting slurry S1, e.g. finely particulate, partly dried sewage sludge having a water content of at most 10%. Arranged at the lower end of the reservoir 2 is a metering valve 6, e.g. a controllable supply unit, which may be connected to an unillustrated transport device for routing the slurry S1 from the reservoir 2 along a conduit 3. Inside the reservoir 2 above the slurry level is a nitrogen cushion 8. A further reservoir 10 receives finely particulate or fine-grained bio-mass S2 via a closeable inlet 12. The bio-mass S2 may involve agricultural waste products or any of the products mentioned above. Discharge of bio-mass S2 from the reservoir 10 is controlled by a metering valve 14 by which the amount of outgoing bio-mass S2 into a conduit 5 can be regulated, optionally with the assistance of an unillustrated transport device. A nitrogen cushion 16 may also be formed above the bio-mass level in the reservoir 10.

The conduits 3, 5 from the reservoirs 2, 10, respectively, are united at a mixing site 18 where the slurry S1 and the biomass S2 are united to produce a mixture M which is conducted from the mixing site 18 via a conduit 7 to a receiving tank 20 for heating the supplied mixture M to a cracking temperature T, ranging from about 250° C. to about 380° C. Introduction of heat is indicated by arrows 22. The receiving tank 20 is hereby constructed of double-jacketed configuration so as to define a passageway 21 which is part of a thermal oil heat circulation. An example of thermal oil includes Meganol 420. As a result of the elevated temperature T in the receiving tank 20, organic molecules of the mixture M are subjected to a thermal cracking process. Substances, in particular mineral fractions of the slurry S1, in the mixture M act hereby as catalyst for the cracking reaction. After undergoing the thermal cracking process, a liquid reaction mixture N, in which the organic substances have been broken down to a large extent as a consequence of the thermal cracking process, exits the tank 20.

Connected to the lower end of the receiving tank 20 is a mixer pump 24 which subjects the liquid reaction mixture N from the receiving tank 20 to a further cracking reaction. A specific construction of a suitable mixer pump for incorporation in the apparatus according to the present invention is fully described in U.S. Patent Application Publication No. US 2007/0131585 A1, the entire specification and drawings of which are expressly incorporated herein by reference. The mixer pump 24 rotates counterclockwise, as indicated by the curved arrow, and has two functions: On one hand, the mixer pump 24 assists a thorough mixing of the reaction mixture N exiting the tank 20 and resulting from the mixture M, and on the other hand, the mixer pump 24 effects a shearing of particles in the reaction mixture N so that the surface is enlarged and efficiency increased.

The mixer pump 24 is connected to a feed line 26 which is part of a reaction circulation and leads to an outgasing device 28 which is accommodated in an intermediate tank 31 and provided to separate organic vapor D from a non-outgased liquid residue R of the reaction mixture N. The intermediate tank 31 is arranged anteriorly of a distillation column 30 which receives the organic vapor D. The liquid residue R collects in a lower portion of the intermediate tank 31 and eventually settles upon the bottom of the intermediate tank 31 as residual matter A for discharge in a collecting vessel 32 and ultimate storage.

Extending from the lower portion of the intermediate tank 31 is a conduit 34 for feeding liquid residues R that have not been distilled as of yet back to the receiving tank 20. The conduit 34 of the intermediate tank 31 thus represents a return line of the reaction circulation.

The mixer pump 24 thus repeatedly feeds liquid reaction mixture N in the reaction circulation comprised of mixer pump 24, feed line 26, outgasing device 28, intermediate tank 31, conduit 34, receiving tank 20, until substantially all organic substances have been thermally cracked and residual matter A has been separated out. In order to initiate the reaction circulation, a high-boiling product should be introduced from the process. In other words, the reaction process commences when liquid residues R from the intermediate tank 31 are added to the mixture N via the conduit 34.

Organic vapor D rising through the distillation column 30 is drained as low-boiling vapor fraction D' from atop the distillation column 30 through a drain line 36 which connects to a condenser 38. The outgased organic vapor fraction D' is cooled down in the condenser 38 and discharged in the form of liquid fuel K through a fuel drain line 46. The fuel K maybe similar, e.g., to diesel oil. Reference numerals 40 and 42 designate coolant lines of the condenser 38, with coolant line 40 constituting a coolant feed line and coolant line 42 constituting a coolant drain line. Reference numeral 44 designates a cooler, indicated here symbolically by horizontal lines. The fuel drain line 46 connects the condenser 38 with a processing device 48 for processing the fuel K, e.g. for dewatering the fuel K, and subsequently to a downstream storage tank 50. The storage tank 50 has an outlet line 52 via which the fuel K can be optionally supplied to a fuel-operated system for example.

In the non-limiting example of the FIGURE, the fuel-operated system involves a turbine generator which includes a turbine 54 and an electric generator 56 which is operatively connected to the turbine 54 by a shaft 55. The turbine generator is used for generating electricity as well as for generating the cracking temperature T via the thermal oil circulation. Fuel K is conducted via the fuel outlet line 52 from the storage tank 50 to the turbine 54 and combusted to thereby drive the electric generator 56. As the fuel K is combusted in the turbine 54, exhaust gas G is produced which is conducted to a heat exchanger 60 and cooled down as it interacts with thermal oil P of the thermal oil circulation. As a result, thermal oil P is heated up and returned via a feed line 66 to the passageway 21 of the receiving tank 20 for heating the mixture M. The cooled down exhaust gas G leaves the heat exchanger 60 via outlet line 62.

The heat exchanger 60 is thus also part of the thermal oil circulation. A temperature controller 64 maintains the thermal oil P in the feed line 66 at a predefined temperature close to the cracking temperature T, e.g. to 350° C. As it enters the passageway 21 and flows there through, the thermal oil P cools slightly and is returned via a return line 68 to the heat exchanger 60 where the incoming exhaust gas G heats the thermal oil P. As an alternative, and in dependence on the temperature adjustment and actual temperature, the temperature controller 64 may control the flow of thermal oil P in such a way that the thermal oil P sidesteps the heat exchanger 60 and flows via a bypass line 70 back to the feed line 66.

As further shown in the FIGURE, the electric generator 56 feeds electric energy via power lines 72 to the public power grid which is symbolized here by a power pole 74. Of course, the power lines 72 may also be electrically connected to a different consumer.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is Set forth in the appended claims and includes equivalents of the elements recited therein:

What is claimed is:

1. Apparatus for thermal processing of slurry, comprising:
a first reservoir for accepting slurry;
a second reservoir for accepting bio-mass;
a mixing area receiving slurry from the first reservoir and bio-mass from the second reservoir for combining slurry and bio-mass to produce a mixture;
a receiving tank, receiving the mixture from the mixing area, for heating the mixture to a cracking temperature to thereby trigger a cracking reaction;
a mixer pump disposed downstream of the receiving tank and receiving liquefied mixture from the receiving tank for continually subjecting the liquefied mixture to the cracking reaction;
an intermediate tank;
an outgasing device accommodated in the intermediate tank;
a distillation column disposed downstream of the intermediate tank;
a feed line fluidly connecting the mixer pump to the outgasing device;
a return line fluidly connecting the intermediate tank and the receiving tank for returning a non-outgased fraction of the mixture; and
a condenser fluidly connected to a top of the distillation column for cooling an outgased vaporized fraction of the mixture to thereby produce fuel, said condenser having an outlet for discharge of the fuel.

2. The apparatus of claim 1, further comprising a processing device, disposed downstream of the outlet of the condenser, for dewatering the fuel.

3. The apparatus of claim 1, further comprising a storage tank fluidly connected to the condenser.

4. The apparatus of claim 1, wherein the receiving tank has a double-jacketed configuration for circulation of hot thermal oil.

5. The apparatus of claim 4, wherein the thermal oil has a temperature adjusted to closely reach the cracking temperature.

6. The apparatus of claim 4, wherein the receiving tank is part of a circulation system for the thermal oil, said circulation system further including a heat exchanger.

7. The apparatus of claim 1, further comprising a turbine receiving fuel from the condenser.

8. The apparatus of claim 7, further comprising a generator operatively connected to the turbine.

9. The apparatus of claim 8, wherein the generator is connected to the public power grid.

10. The apparatus of claim 6, further comprising a turbine receiving fuel from the condenser and fluidly communicating with the heat exchanger.

11. The apparatus of claim 10, further comprising a generator operatively connected to the turbine.

12. The apparatus of claim 11, wherein the generator is connected to the public power grid.

* * * * *